United States Patent
McCloy et al.

(10) Patent No.: US 11,542,842 B2
(45) Date of Patent: Jan. 3, 2023

(54) ELECTRICALLY-ACTUATED CAMSHAFT PHASERS WITH TAPERED FEATURES

(71) Applicant: BorgWarner Inc., Auburn Hills, MI (US)

(72) Inventors: Chad McCloy, Cortland, NY (US); Daniel Brown, Freeville, NY (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 17/328,288

(22) Filed: May 24, 2021

(65) Prior Publication Data
US 2022/0372895 A1    Nov. 24, 2022

(51) Int. Cl.
*F01L 1/344* (2006.01)
*F01L 9/20* (2021.01)
*F16C 19/36* (2006.01)
*F16H 1/28* (2006.01)

(52) U.S. Cl.
CPC ............ *F01L 1/344* (2013.01); *F01L 9/20* (2021.01); *F16C 19/364* (2013.01); *F16C 2360/18* (2013.01); *F16H 1/28* (2013.01); *F16H 2001/2881* (2013.01)

(58) Field of Classification Search
CPC ... F01L 1/344; F01L 1/352; F01L 9/20; F16C 19/364; F16C 2360/18; F16H 1/28; F16H 2001/2881
See application file for complete search history.

(56) References Cited

U.S. PATENT DOCUMENTS

| | | | |
|---|---|---|---|
| 3,635,097 A | 1/1972 | Mears, Jr. | |
| 4,771,654 A * | 9/1988 | Shinjo | F16H 57/021 475/347 |
| 4,979,404 A | 12/1990 | Nakata et al. | |
| 5,203,291 A * | 4/1993 | Suga | F01L 1/344 123/90.31 |
| 5,401,220 A | 3/1995 | Heller | |
| 5,680,836 A * | 10/1997 | Pierik | F16H 35/008 123/90.31 |
| 5,680,837 A * | 10/1997 | Pierik | F01L 1/352 123/90.31 |
| 6,375,206 B1 | 4/2002 | Kinouchi et al. | |
| 6,402,856 B1 | 6/2002 | Vetrano et al. | |
| 8,251,460 B2 | 8/2012 | Veux | |
| 10,180,088 B2 | 1/2019 | McCloy | |
| 2007/0012127 A1 | 1/2007 | Morton | |

(Continued)

FOREIGN PATENT DOCUMENTS

JP     S6164545 U    5/1986
JP     6154330 B2    6/2017

*Primary Examiner* — Loren C Edwards
(74) *Attorney, Agent, or Firm* — Reising Ethington P.C.

(57) ABSTRACT

An electrically-actuated variable camshaft timing (VCT) device, comprising: an input configured to receive rotational force from an electric motor; an output configured to couple with a camshaft of an internal combustion engine; a planet gear having radially outwardly extending gear teeth configured to engage ring gears and a radially-inwardly-facing surface; a planet pin, supporting the planet gear, having an outer surface and an axis of rotation about which the planet gear rotates; and a spring applying force in a substantially axial direction along the axis of rotation that moves the planet gear in a radial direction.

8 Claims, 4 Drawing Sheets

(56) References Cited

U.S. PATENT DOCUMENTS

2007/0151379 A1    7/2007  Lukanen, Jr.
2019/0203768 A1*  7/2019  Meyer ................. F16H 57/0479
2020/0166117 A1*  5/2020  Simon ....................... F02C 7/06

* cited by examiner

ELECTRICALLY-ACTUATED CAMSHAFT PHASERS WITH TAPERED FEATURES

TECHNICAL FIELD

The present application relates to mechanical gearboxes and, more particularly, mechanical gearboxes used with electrically-actuated variable camshaft timing (VCT) devices.

BACKGROUND

Internal combustion engines include camshafts that open and close valves regulating the combustion of fuel and air within combustion chambers of the engines. The opening and closing of the valves are carefully timed relative to a variety of events, such as the injection and combustion of fuel into the combustion chamber and the location of the piston relative to top-dead center (TDC). Camshaft(s) are driven by the rotation of the crankshaft via a drive member connecting these elements, such as a belt or chain. In the past, a fixed relationship existed between the rotation of the crankshaft and the rotation of the camshaft. However, internal combustion engines increasingly use camshaft phasers that vary the phase of camshaft rotation relative to crankshaft rotation. Variable camshaft timing (VCT) devices—camshaft phasers—can, in some implementations, be actuated by electric motors that advance or retard the opening/closing of valves relative to crankshaft rotation.

Electrically-actuated camshaft phasers typically include a gearbox assembly having an input and an output as well as an electric motor. The electric motor can couple to the input of the gearbox assembly while the output of the assembly can be coupled to a camshaft of an internal combustion engine. The components of the gearbox assembly can include a defined amount of space between them that is tolerated. As the gearbox assembly is used, the defined amount of space can cause backlash, which can increase as components wear with use. It would be helpful to be able to reduce this amount of space to minimize the amount of backlash in the gearbox assembly.

SUMMARY

In one implementation, an electrically-actuated variable camshaft timing (VCT) device includes an input configured to receive rotational force from an electric motor; an output configured to couple with a camshaft of an internal combustion engine; a planet gear having radially outwardly extending gear teeth configured to engage ring gears and a radially-inwardly-facing surface; a planet pin, supporting the planet gear, having an outer surface and an axis of rotation about which the planet gear rotates; and a spring applying force in a substantially axial direction along the axis of rotation that moves the planet gear in a radial direction.

In another implementation, an electrically-actuated variable camshaft timing (VCT) device includes an input configured to receive rotational force from an electric motor; an output configured to couple with a camshaft of an internal combustion engine; a planetary gear assembly with a plurality of planet gears each having radially outwardly extending gear teeth configured to engage ring gears and a radially-inwardly-facing surface; planet pins, supporting the planet gears, having an outer surface and an axis of rotation about which the planet gear rotates, received by openings in a carrier plate; and a plurality of springs applying force in a substantially axial direction along the axis of rotation that moves the planet gear in a radial direction.

DETAILED DESCRIPTION

Electrically-actuated camshaft phasers can include one or more planetary gears that are urged radially-outwardly away from an axis of rotation into engagement with one or more ring gears. The mechanism for biasing the planetary gear radially outwardly can direct force axially along the axis of rotation and two corresponding ramped surfaces that are non-parallel to the axis of rotation can convert the axial force into movement radially away from the axis of the rotation and into engagement with one or more ring gears. A spring, in the form of a biasing member, can exert the linear force substantially parallel to the axis of gear rotation moving the gear axially along the axis of rotation. The planet gear can include a radially-inwardly-facing surface that is non-parallel to the axis of gear rotation. The radially-inwardly-facing surface of the planet gear can engage another corresponding surface that is non-parallel to the axis of gear rotation such that the movement of the planet gear along the axis of rotation slides the two surfaces relative to each other and moves the gear radially-outwardly into engagement with one or more ring gears having radially-inwardly-facing gear teeth.

Figure 1:
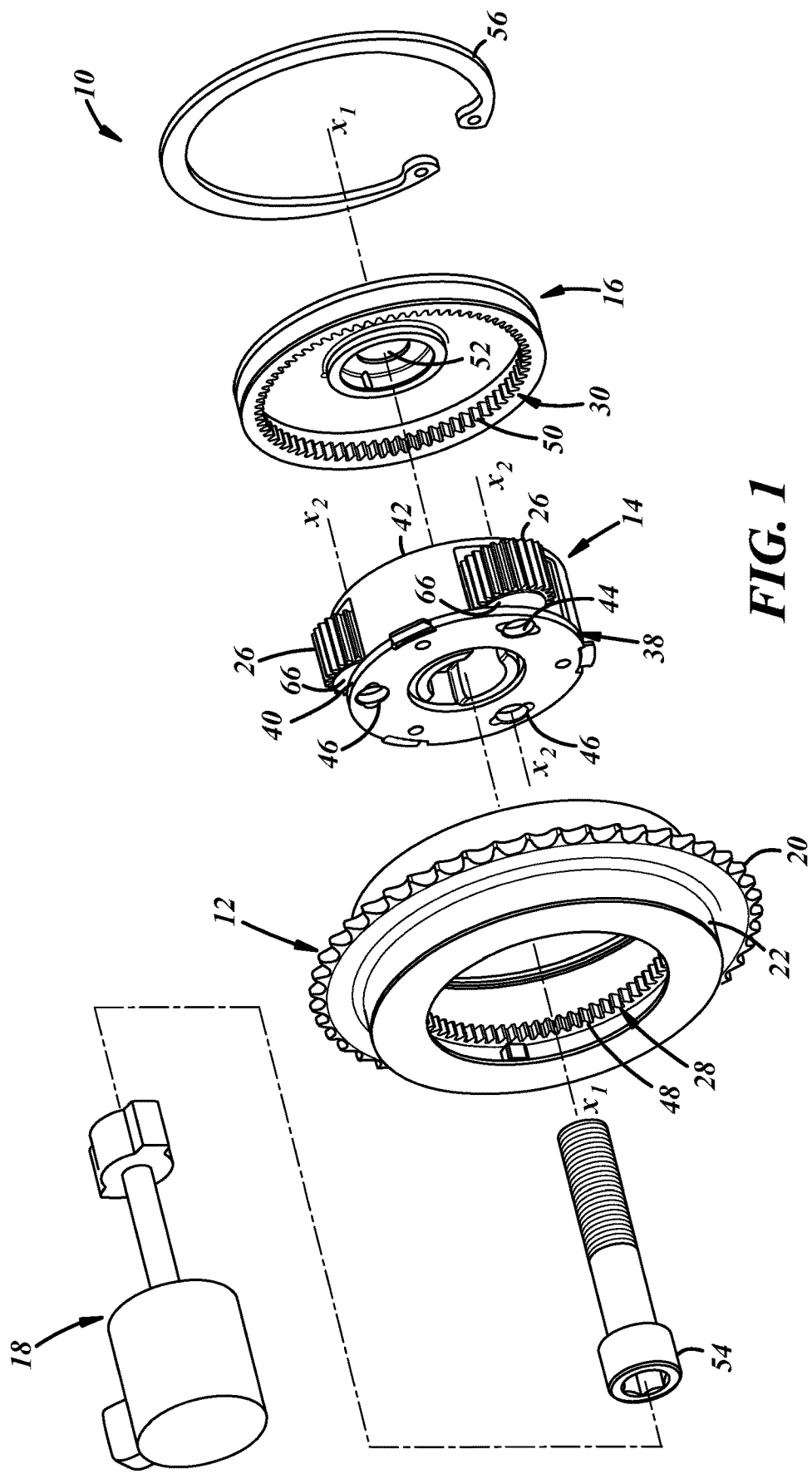
FIG. 1 is an exploded view depicting an implementation of an electrically-actuated camshaft phaser.
Figure 2:
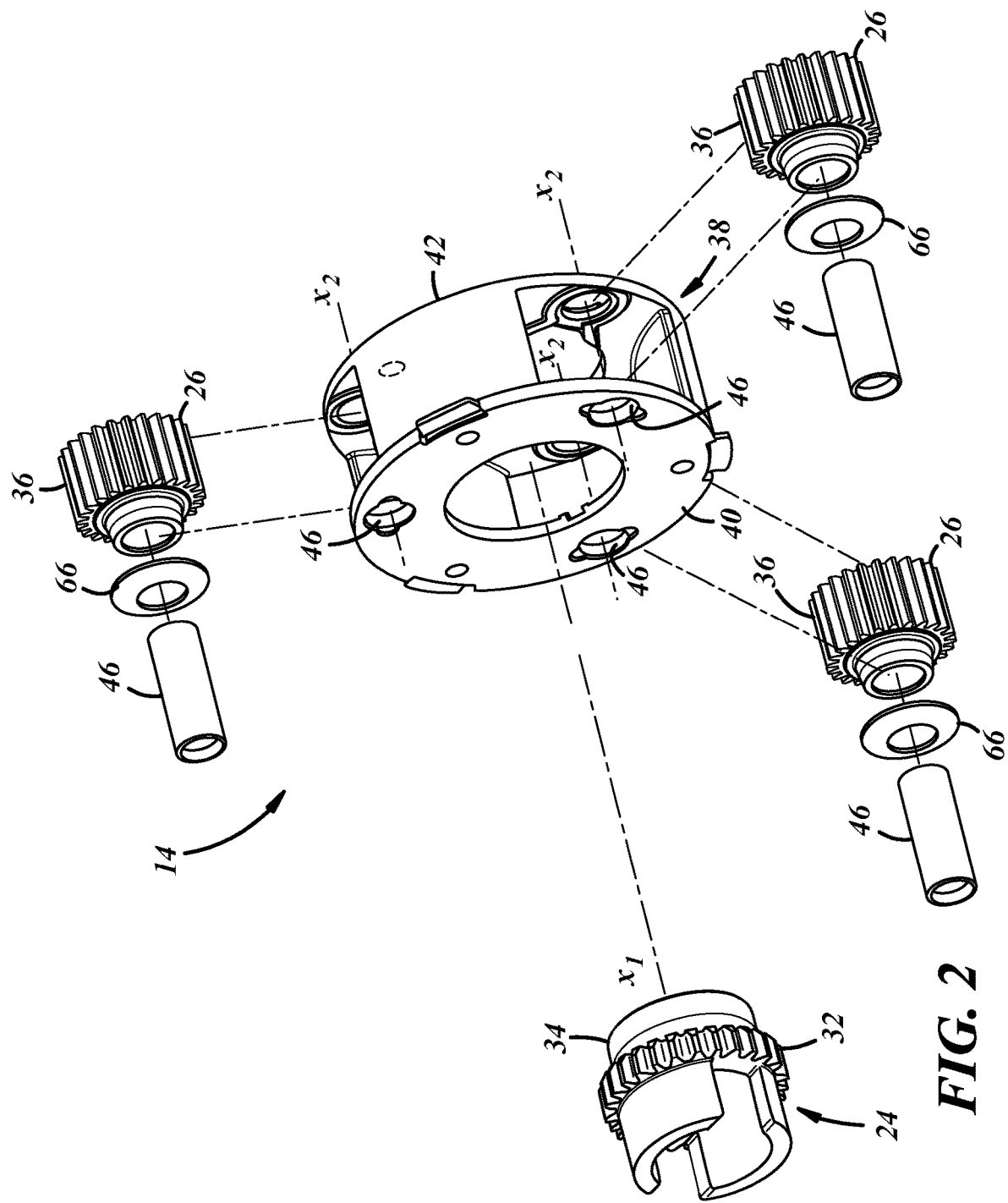
FIG. 2 is an exploded view depicting an implementation of a portion of an electrically-actuated camshaft phaser.

An embodiment of an electrically-actuated camshaft phaser 10 is shown with respect to FIGS. 1-2. The phaser 10 is a multi-piece assembly with components that work together to transfer rotation from the engine's crankshaft and to the engine's camshaft, and that can work together to angularly displace the camshaft relative to the crankshaft for advancing and retarding engine valve opening and closing. The phaser 10 can have different designs and constructions depending upon, among other possible factors, the application in which the phaser is employed and the crankshaft and camshaft that it works with. In the embodiment presented in FIGS. 1-2, for example, the phaser 10 includes a sprocket 12, a planetary gear assembly 14, an inner plate 16, and an electric motor 18.

The sprocket 12 receives rotational drive input from the engine's crankshaft and rotates about an axis $X_1$. A timing chain or a timing belt can be looped around the sprocket 12 and around the crankshaft so that rotation of the crankshaft translates into rotation of the sprocket 12 via the chain or belt. Other techniques for transferring rotation between the sprocket 12 and crankshaft are possible. Along an outer surface, the sprocket 12 has a set of teeth 20 for mating with the timing chain, with the timing belt, or with another component. In different examples, the set of teeth 20 can include thirty-eight individual teeth, forty-two individual teeth, or some other quantity of teeth spanning continuously around the circumference of the sprocket 12. As illustrated, the sprocket 12 has a housing 22 spanning axially from the set of teeth 20. The housing 22 is a cylindrical wall that surrounds parts of the planetary gear assembly 14.

In the embodiment presented here, the planetary gear assembly 14 includes a sun gear 24, planet gears 26, a first ring gear 28, and a second ring gear 30. The sun gear 24 is driven by the electric motor 18 for rotation about the axis $X_1$. The sun gear 24 engages with the planet gears 26 and has a set of teeth 32 at its exterior that makes direct teeth-to-teeth meshing with the planet gears 28. In different examples, the set of teeth 32 can include twenty-six individual teeth, thirty-seven individual teeth, or some other quantity of teeth spanning continuously around the circumference of the sun gear 24. A skirt 34 in the shape of a cylinder spans from the set of teeth 32. As described, the sun gear 24 is an external spur gear, but could be another type of gear.

The planet gears 26 rotate about their individual rotational axes $X_2$ when in the midst of bringing the engine's camshaft among advanced and retarded angular positions. When not advancing or retarding, the planet gears 26 revolve together around the axis $X_1$ with the sun gear 24 and with the ring gears 28, 30. In the embodiment presented here, there are a total of three discrete planet gears 26 that are similarly designed and constructed with respect to one another, but there could be other quantities of planet gears such as two or four or six. However many there are, each of the planet gears 26 can engage with both of the first and second ring gears 28, 30, and each planet gear can have a set of teeth 36 along its exterior for making direct teeth-to-teeth meshing with the ring gears. In different examples, the teeth 36 can include twenty-one individual teeth, or some other quantity of teeth spanning continuously around the circumference of each of the planet gears 26. To hold the planet gears 26 in place and support them, a carrier assembly 38 can be provided. The carrier assembly 38 can have different designs and constructions. In the embodiment presented in the figures, the carrier assembly 38 includes a first carrier plate 40 at one end, a second carrier plate 42 at the other end, and cylinders 44 that serve as a hub for the rotating planet gears 26. Planet pins or bolts 46 can be used with the carrier assembly 38.

The first ring gear 28 receives rotational drive input from the sprocket 12 so that the first ring gear 28 and sprocket 12 rotate together about the axis $X_1$ in operation. The first ring gear 28 can be a unitary extension of the sprocket 12—that is, the first ring gear 28 and the sprocket 12 can together form a monolithic structure. The first ring gear 28 has an annular shape, engages with the planet gears 26, and has a set of teeth 48 at its interior for making direct teeth-to-teeth meshing with the planet gears 26. In different examples, the teeth 50 can include eighty individual teeth, or some other quantity of teeth spanning continuously around the circumference of the first ring gear 28. In the embodiment presented here, the first ring gear 28 is an internal spur gear, but could be another type of gear.

The second ring gear 30 transmits rotational drive output to the engine's camshaft about the axis $X_1$. In this embodiment, the second ring gear 30 drives rotation of the camshaft via the plate 16. The second ring gear 30 and plate 16 can be connected together in different ways, including by a cutout-and-tab interconnection, press-fitting, welding, adhering, bolting, riveting, or by another technique. In embodiments not illustrated here, the second ring gear 30 and the plate 16 could be unitary extensions of each other to make a monolithic structure. Like the first ring gear 28, the second ring gear 30 has an annular shape, engages with the planet gears 28, and has a set of teeth 50 at its interior for making direct teeth-to-teeth meshing with the planet gears 28. In different examples, the teeth 50 can include seventy-seven individual teeth, or some other quantity of teeth spanning continuously around the circumference of the second ring gear 30. With respect to each other, the number of teeth between the first and second ring gears 28, 30 can differ by a multiple of the number of planet gears 26 provided. So, for instance, the teeth 48 can include eighty individual teeth, while the teeth 50 can include seventy-seven individual teeth—a difference of three individual teeth for the three planet gears 26 in this example. In another example with six planet gears, the teeth 48 could include seventy individual teeth, while the teeth 50 could include eighty-two individual teeth. Satisfying this relationship furnishes the advancing and retarding capabilities by imparting relative rotational movement and relative rotational speed between the first and second ring gears 28, 30 in operation. In the embodiment presented here, the second ring gear 30 is an internal spur gear, but could be another type of gear. The plate 16 includes a central aperture 52 through which a center bolt 54 passes to fixedly attach the plate 16 to the camshaft. In addition, the plate 16 is also be secured to the sprocket 12 with a snap ring 56 that axially constrains the planetary gear assembly 14 between the sprocket 12 and the plate 16.

Together, the two ring gears 28, 30 constitute a split ring gear construction for the planetary gear assembly 14. However, other implementations of electrically-controlled camshaft phasers could be used having different gear assemblies. For example, the planetary gear assembly 14 could include an eccentric shaft and a compound planet gear used with first and second ring gears. An example of this is described in U.S. Pat. No. 10,648,375, which is incorporated by reference. Or the planetary gear assembly 14 can be implemented using a harmonic drive as described in U.S. Pat. No. 8,584,633, the contents of which are incorporated by reference. Other implementations are possible using a planetary gear assembly having a split ring gear construction that engages compound planetary gears. That is, the planet gears could be compound such that they each include a first circumferential surface with one tooth count and a second circumferential surface with another tooth count.

Figure 3:
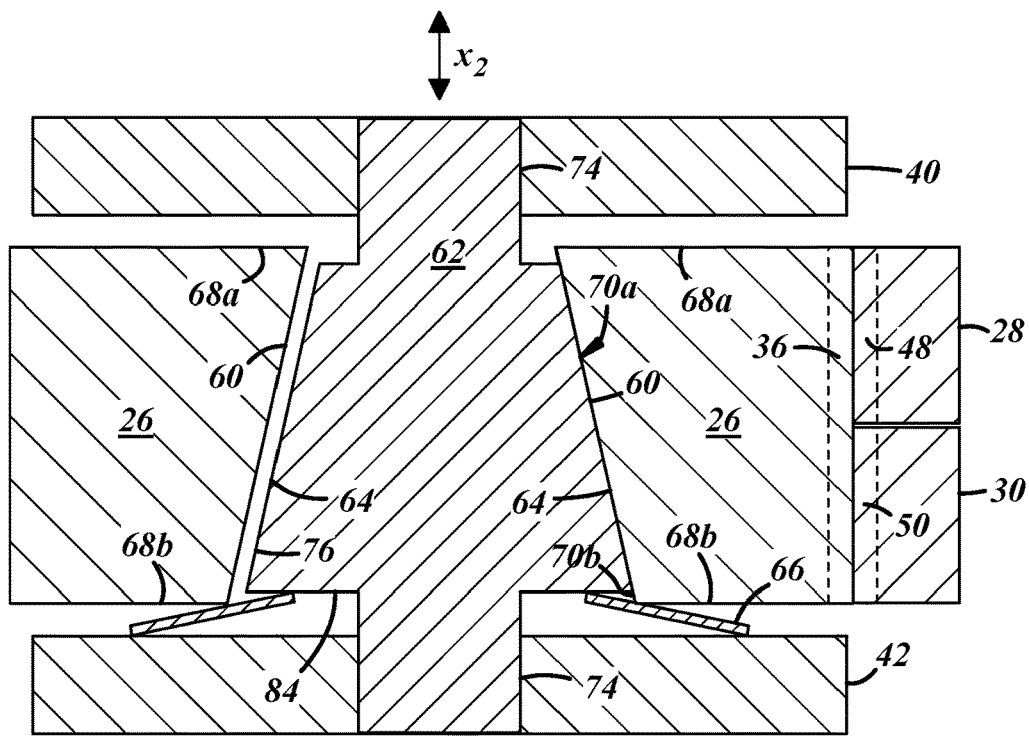
FIG. 3 is a cross-sectional view depicting an implementation of a portion of a gearbox assembly included with an electrically-actuated camshaft phaser.

Turning to FIG. 3, an implementation of the planet gear 26 is shown. The planet gear 26 includes an inner surface 60 that faces radially-inwardly such that the surface 60 is non-parallel to the axis of planet gear rotation ($X_2$). The planet gear 26 can rotate about the axis of rotation ($X_2$) and a planet pin 62 that supports the planet gear 26. The planet pin 62 has an outer surface 64 that is also non-parallel to the axis of rotation ($X_2$). The inner surface 60 of the planet gear 26 and the outer surface 64 of the planet pin 62 closely conform and confront each other. A spring 66 positioned in between the second carrier plate 42 and a radial side 84 of the planet pin 62 can bias the pin 62 in an axial direction along the axis of rotation ($X_2$) relative to the planet gear 26. At least a portion of the inner surface 60 and the outer surface 64 abut each other and slide relative to each other in response to the force exerted by the spring 66. Movement of the planet pin 62 in the axial direction along $X_2$ in response to bias from the spring 66 is translated into radial movement of the planet gear 26 and planet gear teeth 36 into biased engagement with the ring gear teeth 48, 50. That is, the inner surface 60 slides relative to the outer surface 64 thereby moving the planet gear 26 toward the ring gears 28, 30.

In this implementation, the inner surface 60 of the planet gear 26 can be formed as a truncated conical shape that extends from one radial side 68a of the planet gear to another radial side 68b of the planet gear 26. An opening 70a through which the planet pin 62 passes at the radial side 68a has a smaller diameter than an opening 70b at the other radial side 68b. The planet pin 62 can include a cylindrical portion 74 that is received by the first carrier plate 40 and the second carrier plate 42 as well as a truncated cone section 76 that closely conforms to the shape of the inner surface 60.

The spring 66 can be any one of a number of biasing elements, such as a disk spring or Belleville washer, to provide two examples of many different types of springs. A portion of the spring 66 can engage the first carrier plate 40 and another portion of the spring 66 can engage the radial side 68a to force the planet gear 26 away from the carrier plate 40. The force of the spring 66 can move the inner surface 60 of the planet gear 26 against the outer surface 64 of the planet pin 62 to create movement of the planet gear 26 not only axially along the axis of rotation ($X_2$) but also radially into engagement with the ring gears 28, 30. The non-zero angle of the inner surface 60 and outer surface 64 relative to the axis of rotation ($X_2$) can translate the axial force of the spring 66 into radial movement of the planet gear 26.

Figure 4:
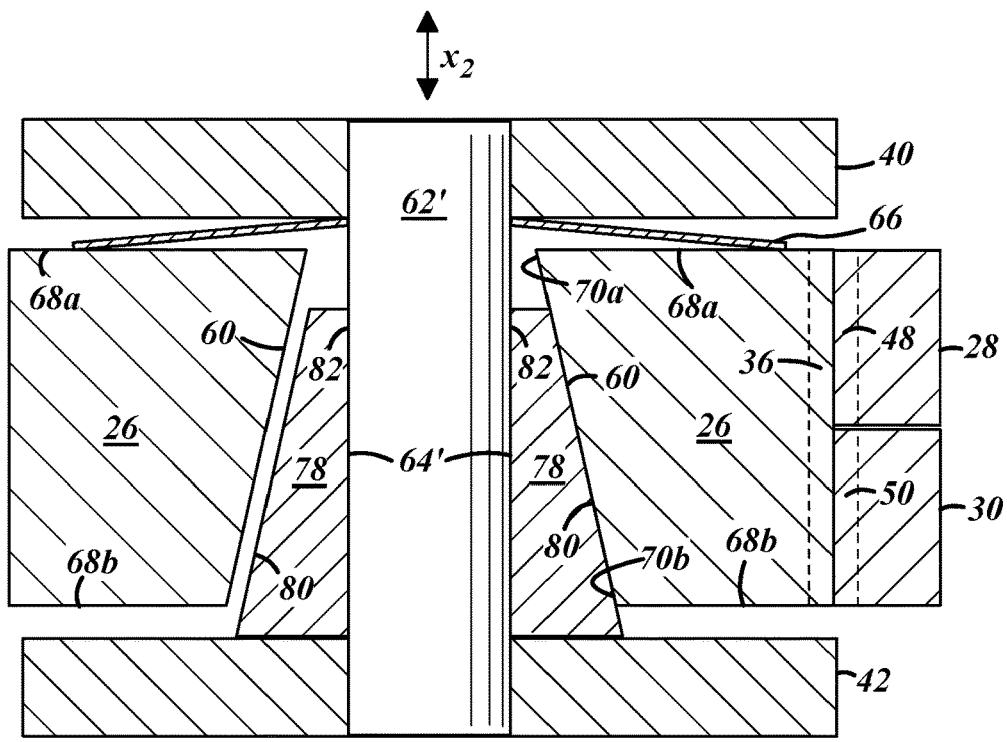
FIG. 4 is a cross-sectional view depicting another implementation of a portion of a gearbox assembly included with an electrically-actuated camshaft phaser.

Turning to FIG. 4, another implementation of the planet gear 26 is shown with a planet pin 62' and tapered rollers 78. The tapered rollers 78 can have an outer surface 80 that is non-parallel to the axis of rotation ($X_2$) and an inner surface 82 that is parallel to the axis ($X_2$). The outer surface 80 of the tapered rollers 78 can closely conform to and engage the inner surface 60 of the planet gear 26 that is also non-parallel to the axis of rotation ($X_2$). The planet gear 26 can rotate about the axis of rotation ($X_2$) and the planet pin 62', which supports the planet gear 26 along with the tapered rollers 78. The planet pin 62' has an outer surface 64' that is substantially parallel to the axis of rotation ($X_2$) and engages the inner surface 82 of the tapered rollers 78. In this implementation, the planet pin 62' can be substantially cylindrical. The spring 66 positioned in between the first carrier plate 40 and a radial side 68a of the planet gear 26 can bias the planet gear 26 in an axial direction along the axis of rotation ($X_2$) relative to the tapered rollers 78. At least a portion of the inner surface 60 and the outer surface 80 of the tapered rollers 78 abut each other and slide relative to each other in response to the force exerted by the spring 66. Movement of the planet gear 26 in the axial direction in response to bias from the spring 66 is also translated into radial movement of the planet gear 26 and planet gear teeth 36 into biased engagement with the ring gear teeth 48, 50. That is, the inner surface 60 slides relative to the outer surface 64 thereby moving the planet gear 26 toward the ring gears 28, 30.

A portion of the spring 66 can engage the first carrier plate 40 and another portion of the spring 66 can engage the radial side 68a to force the planet gear 26 away from the carrier plate 40. The force of the spring 66 can move the inner surface 60 of the planet gear 26 against the outer surface 80 of the tapered rollers 78 to create movement of the planet gear 26 not only axially along the axis of rotation ($X_2$) but also radially into engagement with the ring gears 28, 30. The non-zero angle of the inner surface 60 and outer surface 80 relative to the axis of rotation ($X_2$) can translate the axial force of the spring 66 into radial movement of the planet gear 26. The tapered rollers 78 can be implemented as tapered bearing assemblies or other similar needle bearings. The outer surface 80 can refer to the bearing surface of the tapered bearing assemblies.

Figure 5:
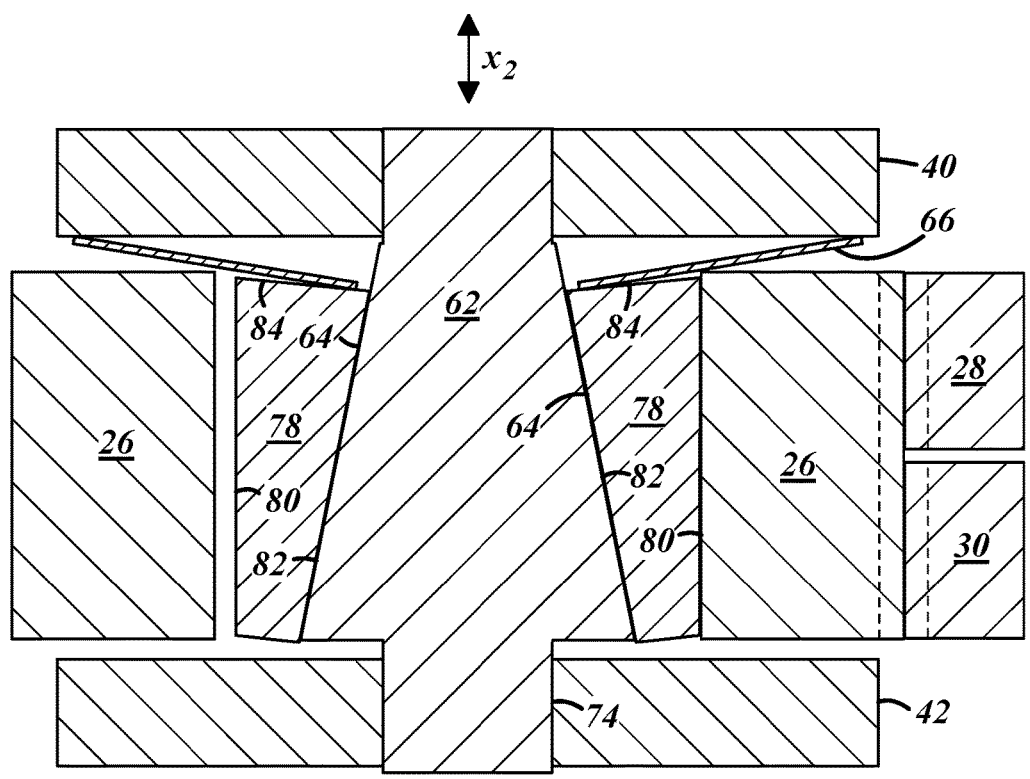
FIG. 5 is a cross-sectional view depicting another implementation of a portion of a gearbox assembly included with an electrically-actuated camshaft phaser.

FIG. 5 depicts another implementation including the planet pin 62 with tapered rollers 78 in between the pin 62 and the planet gear 26. The planet pin 62 has an outer surface 64 that is also non-parallel to the axis of rotation ($X_2$). The tapered rollers 78 can have an outer surface 80 that is parallel to the axis of rotation ($X_2$) and an inner surface 82 that is non-parallel to the axis ($X_2$). The inner surface 82 of the tapered rollers 78 can closely conform to and engage the outer surface 64 of the planet pin 62 that is also non-parallel to the axis of rotation ($X_2$). A portion of the spring 66 can engage the first carrier plate 40 and another portion of the spring 66 can engage a radial side 84 of the tapered rollers 78 to force the planet gear 26 away from the carrier plate 40. The force of the spring 66 can move the outer surface 64 of the planet pin 62 against the inner surface 82 of the tapered rollers 78 to create movement of the planet gear 26 not only axially along the axis of rotation ($X_2$) but also radially into engagement with the ring gears 28, 30. The non-zero angle of the outer surface 64 and inner surface 82 relative to the axis of rotation ($X_2$) can translate the axial force of the spring 66 into radial movement of the planet gear 26.

Figure 6:
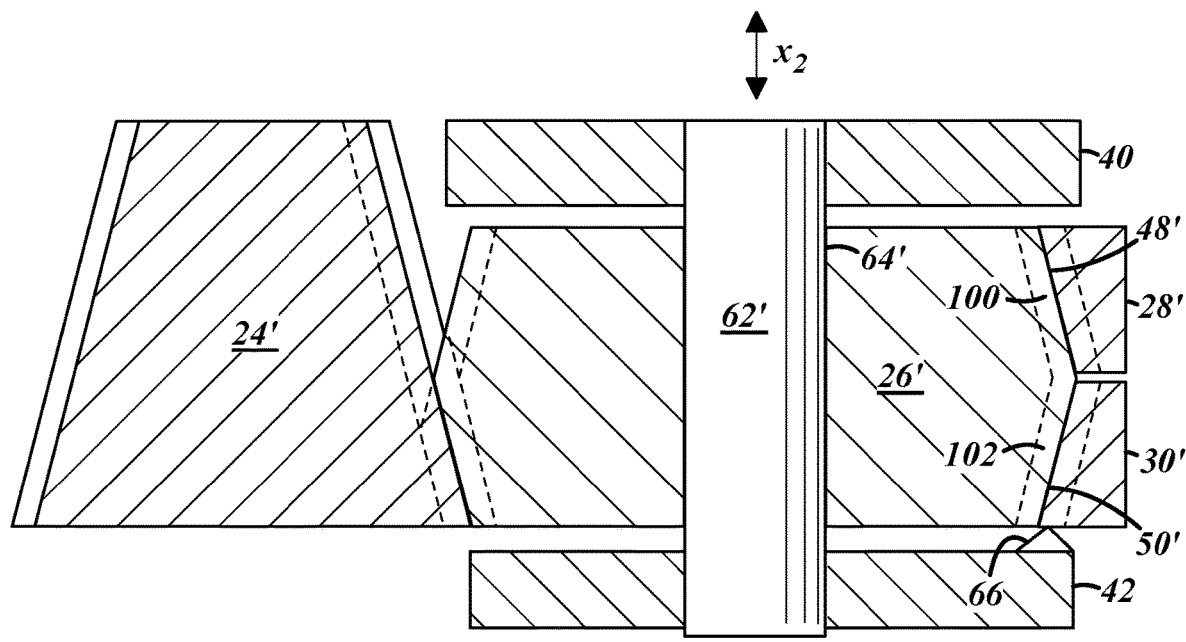
FIG. 6 is a cross-sectional view depicting another implementation of a portion of a gearbox assembly included with an electrically-actuated camshaft phaser

FIG. 6 depicts yet another implementation including a sun gear 24', a planet gear 26', the planet pin 62', a first ring gear 28', and a second ring gear 30'. The planet pin 62' has an outer surface 64' that is parallel to the axis of rotation ($X_2$). However, the sun gear 24', the planet gear 26', the first ring gear 28', and the second ring gear 30' each have geared surfaces that are non-parallel to the axis of rotation ($X_2$). The first ring gear 28' includes a set of teeth 48' that are not parallel relative to the axis of rotation ($X_2$) and the second ring gear 30' includes a set of teeth 50' that are not parallel to the axis of rotation ($X_2$). The planet gear 26' can be implemented as a bevel gear having a first geared surface 100 and a second geared surface 102 that are each non-parallel to the axis of rotation ($X_2$). The sun gear 26' can be implemented as a bevel gear in which the geared surface 32' is not parallel to the axis of rotation ($X_2$). A spring 66 can exert a linear force toward a radial face of the first ring gear 28' or the second ring gear 30'. The spring 66 can move the ring gear 30' axially relative to the axis of rotation ($X_2$) and the planet pin 62'; the planet gear 26' moves radially relative to the axis of rotation ($X_2$) thereby biasing the planet gear 26' into engagement with both ring gears 28', 30' as well as the gear teeth 32'.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electrically-actuated variable camshaft timing (VCT) device, comprising:
   an input configured to receive rotational force from an electric motor;
   an output configured to couple with a camshaft of an internal combustion engine;
   a planet gear having a plurality of radially-outwardly-extending-gear teeth configured to engage a plurality of ring gears and a radially-inwardly-facing surface;
   a planet pin, supporting the planet gear, having an outer surface and an axis of rotation about which the planet gear rotates; and
   a spring applying force in a substantially axial direction along the axis of rotation that moves the planet gear in a radial direction, wherein the force applied by the spring is also directed radially toward the plurality of ring gears,
   wherein the radially-inwardly-facing surface is non-parallel to the axis of rotation.

2. The electrically-actuated VCT device recited in claim 1, wherein the planet pin comprises a cylindrical section and a surface that is non-parallel to the axis of rotation.

3. The electrically-actuated VCT device recited in claim 1, wherein the spring abuts a carrier plate and a radial face of the planet gear.

4. The electrically-actuated VCT device recited in claim 1, wherein the outer surface of the planet pin is non-parallel to the axis of rotation.

5. The electrically-actuated VCT device recited in claim 1, wherein the planet pin can move axially along the axis of rotation.

6. The electrically-actuated VCT device recited in claim 1, wherein the spring abuts a surface of the planet pin.

7. An electrically-actuated variable camshaft timing (VCT) device, comprising:
   an input configured to receive rotational force from an electric motor;
   an output configured to couple with a camshaft of an internal combustion engine;
   a planetary gear assembly with a plurality of planet gears each having a plurality of radially outwardly extending gear teeth configured to engage a plurality of ring gears and a radially-inwardly-facing surface;
   planet pins, supporting the planet gears, having an outer surface and an axis of rotation about which the planet gear rotates, received by openings in a carrier plate; and
   a plurality of springs applying force in a substantially axial direction along the axis of rotation that moves the planet gear in a radial direction, wherein the force applied by each respective spring is also directed radially toward the plurality of ring gears,
   wherein the radially-inwardly-facing surface is non-parallel to an axis of rotation of the planet gear.

8. The electrically-actuated VCT device recited in claim 7, wherein the planet pins comprise a cylindrical section and a surface that is non-parallel to the axis of rotation.

* * * * *